(12) United States Patent
Ide et al.

(10) Patent No.: US 7,008,279 B2
(45) Date of Patent: Mar. 7, 2006

(54) DRIVE SHAFT SUPPORT STRUCTURE FOR MARINE PROPULSION MACHINE

(75) Inventors: Shinichi Ide, Wako (JP); Yoshiyuki Matsuda, Wako (JP); Masahiro Akiyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 50 days.

(21) Appl. No.: 10/824,943

(22) Filed: Apr. 15, 2004

(65) Prior Publication Data

US 2004/0229525 A1 Nov. 18, 2004

(30) Foreign Application Priority Data

Apr. 18, 2003 (JP) .............................. 2003-114850

(51) Int. Cl.
*B63H 21/38* (2006.01)
(52) U.S. Cl. ...................................... 440/88 L; 440/83
(58) Field of Classification Search .................. 440/78, 440/83, 88 R, 88 L; 74/417
See application file for complete search history.

(56) References Cited

U.S. PATENT DOCUMENTS

| | | | |
|---|---|---|---|
| 3,943,790 A * | 3/1976 | Meyer ......................... | 440/78 |
| 4,650,428 A | 3/1987 | Bland et al. | |
| 4,820,211 A | 4/1989 | Onoue | |
| 4,917,639 A * | 4/1990 | Onoue ....................... | 440/88 R |
| 5,820,425 A * | 10/1998 | Ogino et al. .................. | 440/78 |
| 6,702,632 B1 * | 3/2004 | Kameoka .................. | 440/88 L |
| 6,814,635 B1 * | 11/2004 | Okabe .......................... | 440/83 |

FOREIGN PATENT DOCUMENTS

JP 08-034394 2/1996

* cited by examiner

*Primary Examiner*—Lars A. Olson
(74) *Attorney, Agent, or Firm*—Carrier, Blackman & Associates, P.C.; Joseph P. Carrier; William D. Blackman

(57) ABSTRACT

In a drive shaft support structure for a marine propulsion machine, a gear case is provided with a vertical drive shaft receiving, bore and a drive shaft driven by an internal combustion engine is supported for rotation in the drive shaft receiving bore. A gear case is provided with a gear chamber connected to the lower end of the drive shaft receiving bore. A bevel gear mechanism for transmitting power from the drive shaft to a propeller shaft is disposed in the gear chamber. The drive shaft is supported for rotation in a bearing. The bearing is fitted in the drive shaft receiving bore and is held fixedly in place with a bearing-fastening member screwed in an internal threaded part of the drive shaft receiving bore. A covering member provided with a central hole through which the drive shaft is passed is attached to the gear case so as to close the open upper end of the drive shaft receiving bore in a liquid-tight fashion. The bearing is held fixedly in the gear case to prevent the vertical movement of the drive shaft.

16 Claims, 13 Drawing Sheets

DRIVE SHAFT SUPPORT STRUCTURE FOR MARINE PROPULSION MACHINE

BACKGROUND OF THE INVENTION

1. Field of the Invention

The present invention relates to a marine propulsion machine, such as an outboard motor having an outboard internal combustion engine or an outboard/inboard motor having an inboard internal combustion engine and, more particularly, to a drive shaft support structure built in a gear case for a marine propulsion machine.

2. Description of Background Art

A gear case, forming a lower part of a marine propulsion machine, defines a gear chamber therein for housing a bevel gear mechanism, used for transmitting power from a drive shaft to a propeller shaft. A drive shaft receiving bore extends downwardly from an upper end wall of the gear case, and the gear chamber is connected to the lower end of the drive shaft receiving bore. The drive shaft, extended through the drive shaft receiving bore, is supported for rotation in a bearing. Sufficient lubricating oil is contained in the gear chamber and the drive shaft receiving bore to lubricate the bevel gear mechanism placed in the gear chamber, and also to lubricate the bearing disposed in the drive shaft receiving bore.

A gear case of this general kind for a marine propulsion machine, disclosed in JP 8-34394 A, has a drive shaft receiving bore with an open upper end covered with the pump case of a water pump, to seal the drive shaft receiving bore and a gear chamber in a liquid-tight fashion.

In the gear case disclosed in JP 8-34394 A, a bearing is held between a flange of a drive shaft and the gear case, but is not fastened to the gear case. The bearing is held in place by gravity, and also by a downward thrust acting on a bevel gear included in a bevel gear mechanism. Since the bearing is not restrained from upward movement, it is possible that the bearing moves vertically together with the drive shaft.

The present invention has been made in view of such a problem as described above, and it is therefore an object of the present invention to provide a simple drive shaft support structure incorporated into a gear case for a marine propulsion machine, capable of sealing a gear chamber defined by the gear case in a liquid-tight fashion. It is another object of the present invention to provide a drive shaft support structure capable of fixedly holding a bearing in the gear case to restrain a drive shaft from vertical movement therein.

SUMMARY OF THE INVENTION

To achieve the above object, the present invention provides a drive shaft support structure for a marine propulsion machine having a gear case forming a lower part thereof, in which the marine propulsion machine is provided with a vertical drive shaft receiving bore and a gear chamber connected to the lower end of the drive shaft receiving bore, and receiving a bevel gear mechanism for transmitting power from a drive shaft, supported in the drive shaft receiving bore for rotation in a bearing fixedly held in the drive shaft receiving bore, to a propeller shaft. The drive shaft support structure according to a first aspect of the present invention includes a bearing-fastening member for holding the bearing in the drive shaft receiving bore so that the bearing is substantially vertically fixed in place in the drive shaft receiving bore; and a covering member penetrated by the drive shaft, wherein the covering member is disposed above the bearing-fastening member, and closes an upper end of the drive shaft receiving bore in a liquid-tight fashion.

According to the present invention, the covering member closes the open upper end of the drive shaft receiving bore in a liquid-tight fashion, and the bearing fastening member fixedly disposed below the covering member in the drive shaft receiving bore fixedly holds the bearing supporting the drive shaft for rotation in place. Thus, the drive shaft can be restrained from vertical movement by a simple structure.

Since the covering member independent of the bearing fastening member fixedly holding the bearings closes the open upper end of the drive shaft receiving bore in a liquid-tight fashion, vertical force acting on the drive shaft does not affect the covering member and hence the gap between the covering member and the drive shaft can be easily sealed, a structure for attaching the covering member to the gear case is simplified to avoid increasing the dimensions of the gear case.

Preferably, the gear case is provided in a part of the drive shaft receiving bore with an internal thread, the bearing-fastening member is provided with an external thread for mating with the internal thread of the gear case, and the bearing-fastening member is screwed in the part provided in the internal threaded portion of the drive shaft receiving bore, to hold the bearing fixedly in the drive shaft receiving bore. Thus, the bearing-fastening member can be simply and easily attached to the gear case.

Preferably, a part of the drive shaft receiving bore extending below the internal thread is reduced to form a shoulder, the bearing is seated on the shoulder, and the bearing-fastening member is screwed in the part provided with the internal thread of the drive shaft receiving bore) so as to press the bearing against the shoulder, in order to hold the bearing between the bearing-fastening member and the shoulder.

Preferably, a part of the drive shaft receiving bore between the internal thread and the shoulder is tapered downwardly to form a tapered bearing part, the bearing has a tapered circumference tapering downwardly, and the bearing is held in place in the drive shaft receiving bore with the tapered circumferences thereof in close contact with the tapered surface of the tapered bearing part of the drive shaft receiving bore. Thus, the bearing is held securely in the tapered bearing part.

The bearing-fastening member may have a ring shape having a polygonal central hole in which a turning tool engages. The bearing-fastening member can be turned with the turning tool to facilitate work for screwing the bearing-fastening member in the internally threaded part of the drive shaft receiving bore.

The bearing-fastening member may be provided at its lower end with an annular ridge that is pressed against the upper one of the bearings. The annular ridge of the bearing-fastening member is pressed against the bearing to hold the bearing fixedly in the drive shaft receiving bore.

The open upper end of the drive shaft receiving bore may be sunk beneath the upper surface of the gear case, the covering member may be provided with a flange, and the covering member may be positioned with the flange seated on the open upper end of the drive shaft receiving bore.

The covering member may have a body part having the shape of a disk, an upper cylindrical part projecting upward from the body part, an inner cylindrical part projecting downward from the body part, and an outer cylindrical part projecting downward from the body part and surrounding the inner cylindrical part, and the outer cylindrical part may be fitted in the upper end part of the drive shaft receiving bore. Thus, the covering member can be surely positioned.

Preferably, the body part of the covering member is provided with a boss, and the boss is attached to the gear case. Thus, the covering member can be surely fixed to the gear case.

A sealing member may be held between the inner cylindrical part and the drive shaft, and an O-ring may be held between the outer cylindrical part and the side surface of the drive shaft receiving bore. Thus, the interior of the covering member can be sealed in a liquid-tight fashion.

A space may be formed between the covering member and the bearing-fastening member in the drive shaft receiving bore, and the space may be connected through a connecting hole to a lubricant supply source. Thus, lubricating oil can be surely supplied into the drive shaft receiving bore.

An under panel having an opening through which the drive shaft is passed may be disposed on the upper surface of the gear case so as to extend across the drive shaft receiving bore, and a water pump driven by the drive shaft may be mounted on the under panel.

DESCRIPTION OF THE PREFERRED EMBODIMENTS

A preferred embodiment of the present invention will be described with reference to FIGS. 1 to 18.

Figure 1:
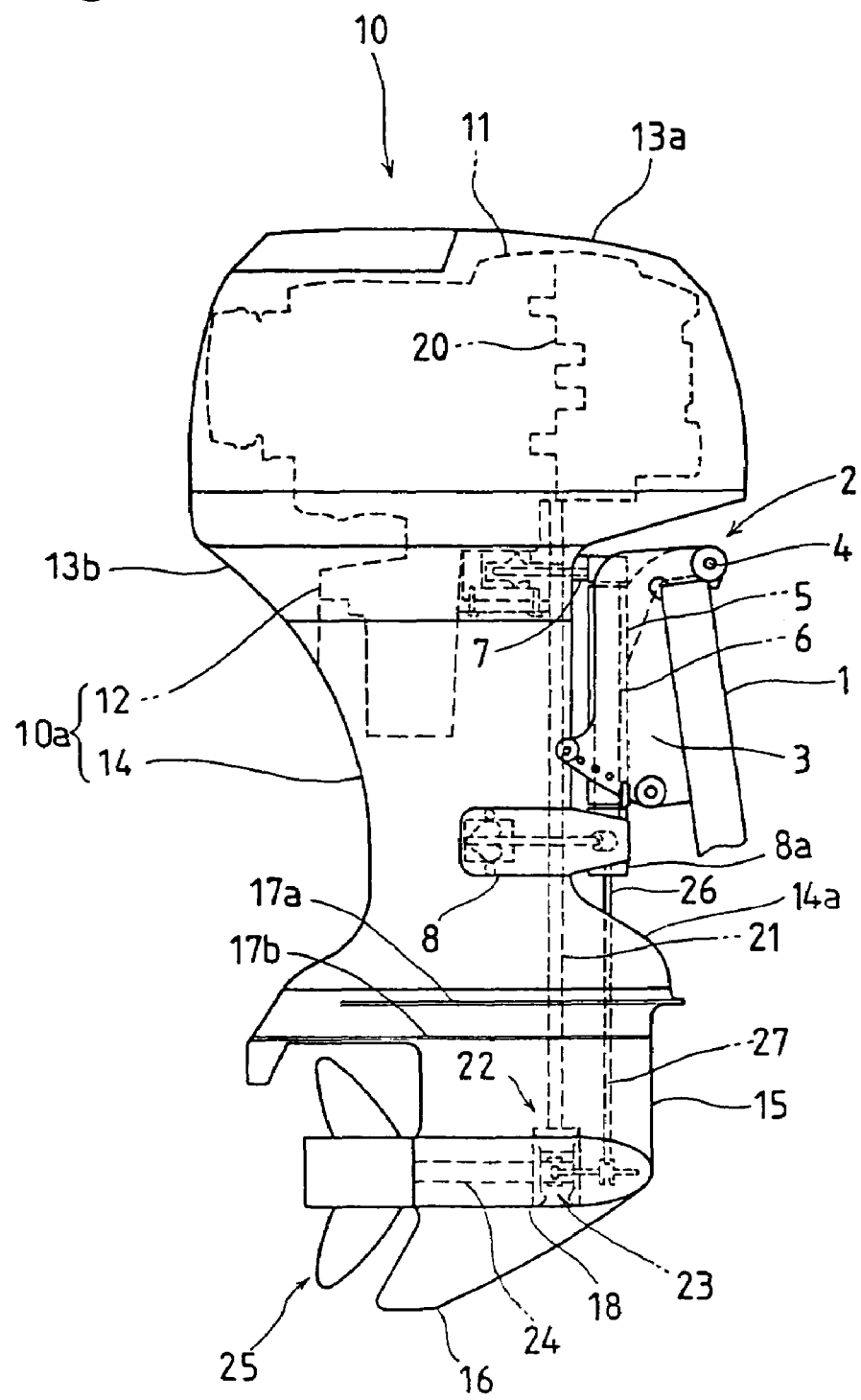
FIG. 1 is a side elevational view of an outboard engine including a gear case provided with a drive shaft support structure in a preferred embodiment of the present invention.

FIG. 1 is a side elevation of an outboard engine 10 relevant to the present invention. The outboard engine 10 is attached to the transom 1 of a boat by a transom clamp 2.

The transom clamp 2 includes a bracket 3 fastened to the transom 1 with bolts, and a swivel case 5 pivotally supported for turning in a vertical plane by a tilt shaft 4 horizontally extended on a front end part of the bracket 3. The swivel case 5 supports a swivel shaft 6 substantially vertically for turning.

The outboard engine 10 has an engine body 10a connected to the swivel shaft 6 by an upper connecting member 7 and a lower connecting member 8. The outboard engine 10 is able to turn in a vertical plane on the tilt shaft 4 and to turn in a horizontal plane about the axis of the swivel shaft 6. The engine body 10a includes an extension case 14 connected to at least the connecting member 7 (or the connecting member 8), and a mount case 12 connected to the other connecting member 8 (or the connecting member 7). The mount case 12 is combined with the extension case 14.

An internal combustion engine 11 is fixedly mounted on the mount case 12. The mount case 12 and the extension case 14 are combined to support the internal combustion engine 11 and a drive mechanism. An oil case or the like may be interposed between the mount case 12 and the extension case 14.

An engine cover 13a covers at least an upper half part of the internal combustion engine 11. The engine body 10a has an under cover 13b covering a lower half part of the internal combustion engine 11. The engine body 10a defines the appearance of the outboard engine 10. A gear case 15 is connected to the lower end of the extension case 14 of the engine body 10a.

When the boat is stationary or cruising at a low speed, a lower part of the outboard engine 10 below a part around the lower connecting member 8 is a submerged part that submerges in water.

The internal combustion engine 11 has a substantially vertical crankshaft 20. A drive shaft 21 coupled with the crankshaft 20 extends down through the extension case 14 into the gear case 15.

A bevel gear mechanism 22 and a forward/backward selector clutch mechanism 23 are housed in the gear case 15. The rotation of the substantially vertical drive shaft 21 is transmitted through the bevel gear mechanism 22 to a substantially horizontal propeller shaft 24 to rotate a screw propeller 25 mounted on the propeller shaft 24.

An upper shift rod 26, for operating the forward/backward selector clutch mechanism 23, is supported for rotation in front of the drive shaft 21 and parallel to the latter. The upper shift rod 26 is extended through the swivel shaft 6 between the mount case 12 and the gear case 15. A lower shift rod 27, coaxially coupled with the upper shift rod 26, is inserted in the gear case 15.

The gear case 15 of the outboard engine 10 is an aluminum alloy casting. The gear case 15 has a gear housing 18 defining a gear chamber 15a and having the shape of an artillery shell. The upper and the lower part have a streamline shape in a plane. A lower rear part of the gear case 15 is recessed to form a triangular skeg 16.

Splash guards 17a and anti-cavitation plates 17b extend sideways from the opposite side surfaces of an upper part of the gear case 15. The splash guards 17a are above the anti-cavitation plates 17b.

The gear housing 18 having the shape of an artillery shell extends longitudinally in a horizontal plane above the skeg 16 and bulges out sideways. The gear housing 18 has a closed front end having the shape of the head of an artillery shell, and an open rear end.

Figure 3:
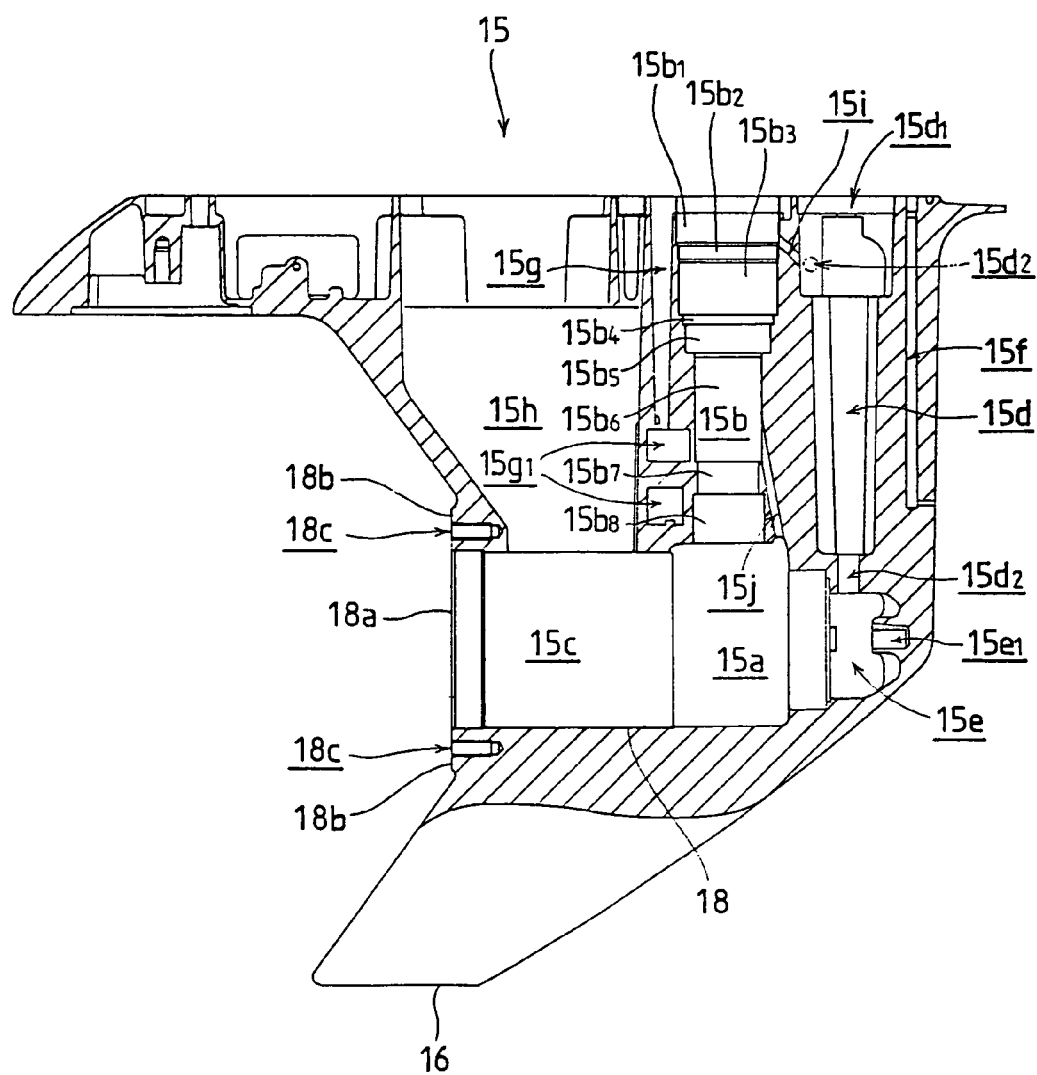
FIG. 3 is a sectional detail view of a lower portion of the gear case shown in FIG. 1.

Referring to FIG. 3, the gear chamber 15a is formed in a front part of the gear housing 18. A drive shaft receiving bore 15b extends upward from the gear chamber 15a. A propeller shaft receiving bore 15c extends between the gear chamber 15a and the open back end of the gear housing 18.

The substantially vertically extending drive shaft receiving bore 15b, the gear chamber 15a joined to the lower end of the drive shaft receiving bore 15b, and the propeller shaft receiving bore 15c extended horizontally backward from the gear chamber 15a cooperate to form a substantially L-shaped hollow in the gear case 15.

A shift rod receiving bore 15d is formed in front of the drive shaft receiving bore 15b parallel to the drive shaft receiving bore 15b at a short distance from the drive shaft receiving bore 15b. The shift rod receiving bore 15d opens into a recess 15e of a small diameter formed in front of the gear chamber 15a.

A small speed-measuring bore 15f is formed in front of the shift rod receiving bore 15d parallel to the latter in the gear case 15. A lower end part of the speed-measuring bore 15f is bent forward and opens into the space outside the gear case 15.

Figure 2:
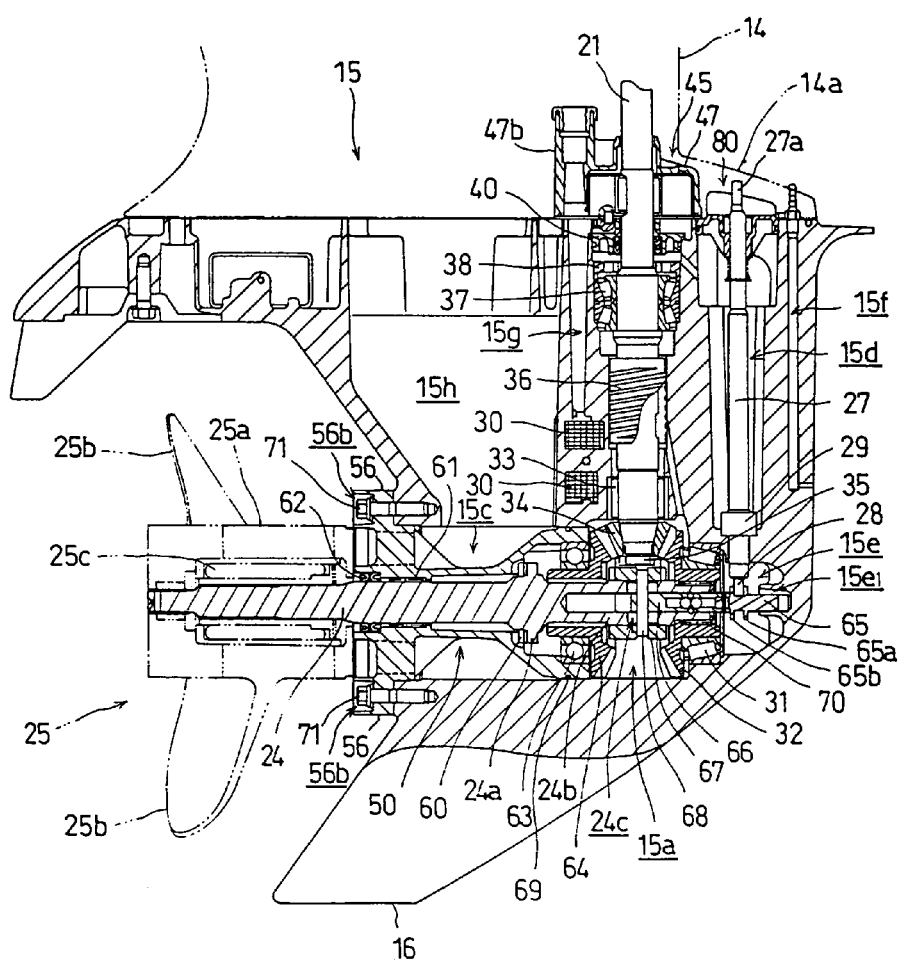
FIG. 2 is a sectional view of a drive mechanism built in the gear case shown in FIG. 1.

A suction passage 15g through which water is pumped up is formed behind the drive shaft receiving bore 15b so as to extend along the latter. A lower part of the suction passage 15g is connected to suction ports $15g_1$ covered with filters 30 as shown in FIG. 2. A longitudinal, flat exhaust passage 15h having an open upper end is formed behind the suction passage 15g. A lower end part of the exhaust passage 15h extends through the upper wall of the gear housing 18.

Figure 4:
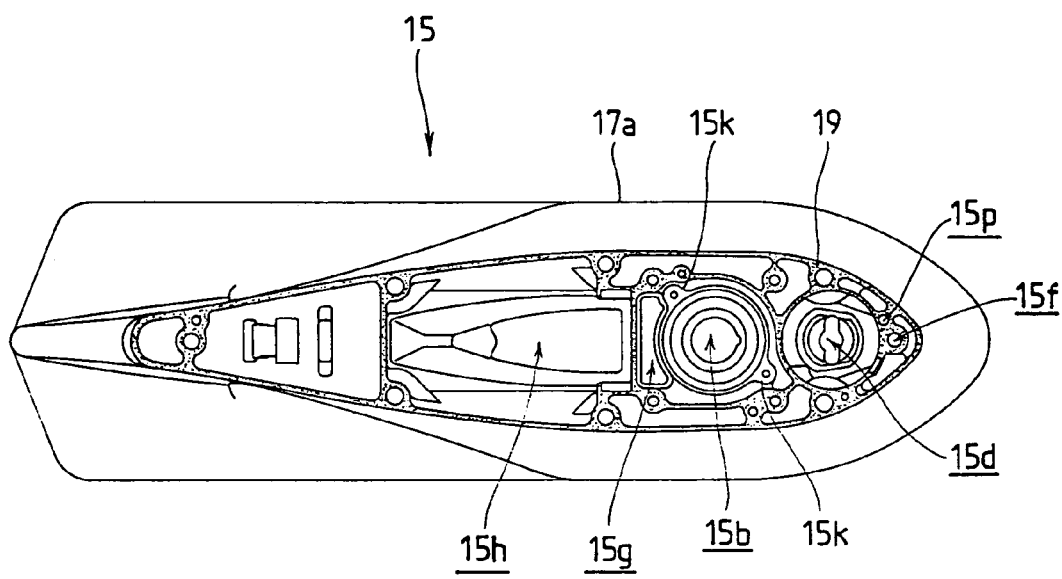
FIG. 4 is a top view of the lower gear case portion shown in FIG. 3.
Figure 5:
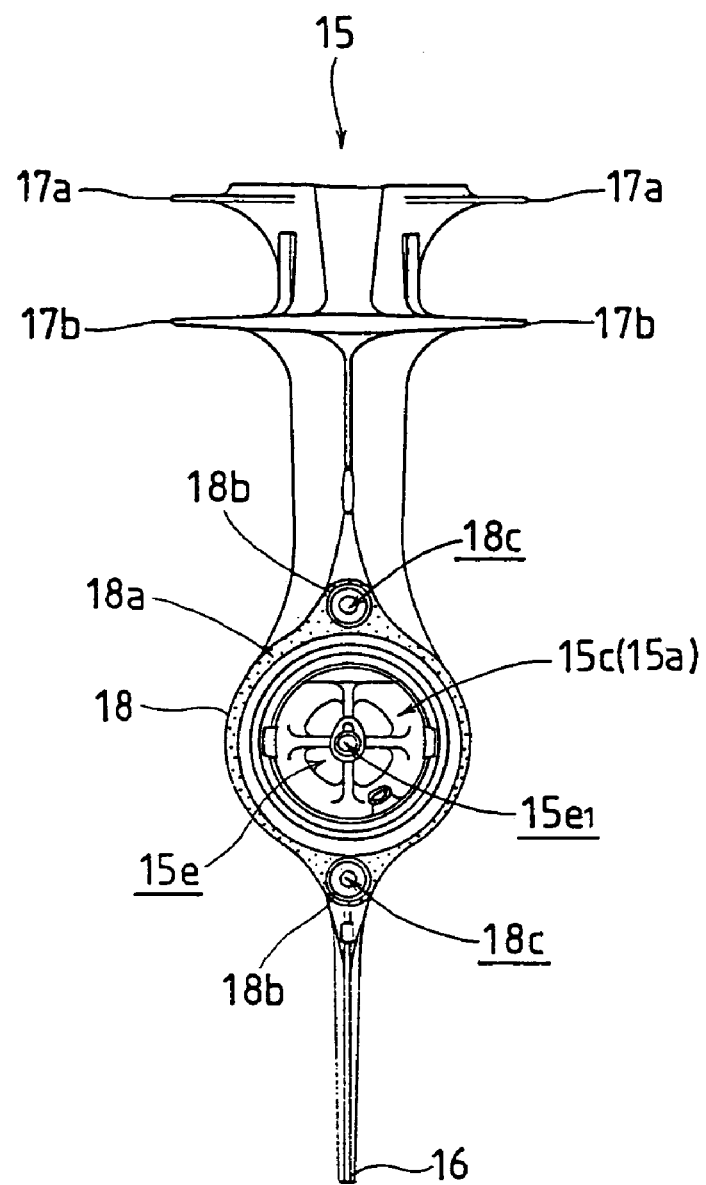
FIG. 5 is a rear view of the lower gear case portion shown in FIG. 3.

Referring to FIG. 4, the respective open upper ends of the drive shaft receiving bore 15b, the shift rod receiving bore 15d, the speed-measuring bore 15f, the suction passage 15g and the exhaust passage 15h open in the joining surface 19 represented by an area shaded with dots in FIG. 4, i.e., the upper end surface joined to the extension case 14, of the gear case 15. The open upper end of tile drive shaft receiving bore 15b sinks slightly beneath the joining surface 19. The gear housing 18 of the gear case 15 has the open rear end.

Referring to FIG. 3, the drive shaft receiving bore 15b receiving the drive shaft 21 has an upper end part $15b_1$ of the largest diameter, an internally threaded part $15b_2$ extending down from the upper end part $15b_1$ and provided with an internal thread having a major diameter substantially equal to the diameter of the upper end part $15b_1$, and a bearing part $15b_3$ extending down from the internally threaded part $15b_2$ and having a diameter substantially equal to the minor diameter of the internal thread of the internally threaded part $15b_2$.

An intermediate part $15b_5$ of a medium diameter extends downward from the bearing part $15b_3$ so as to form a shoulder $15b_4$ at the lower end of the bearing part $15b_3$. A reduced oil-pumping part $15b_6$ extends downward from the intermediate part $15b_5$, a reduced part $15b_7$ extends down from the oil-pumping part $15b_6$, and a slightly expanded bearing part $15b_8$ of a diameter greater than that of the reduced part $15b_7$ extends down from the reduced part $15b_7$ and opens into the gear chamber 15a.

A connecting hole 15i extends obliquely downward from a lower front part of the upper end part $15b_1$ having the largest diameter into the shift rod receiving bore 15d to connect respective upper parts of the drive shaft receiving bore 15b and the shift rod receiving bore 15d.

A suction oil passage 15j extends obliquely downward from a lower front part of the oil-pumping part $15b_6$ opens into the gear chamber 15a to connect a lower part of the drive shaft receiving bore 15b and the gear chamber 15a.

The drive shaft 21 is inserted through the upper end of the drive shaft receiving bore 15b in the latter. A taper roller bearing 31 is fitted in the front reduced part of the gear chamber 15a and a forward driven gear 32, i.e., a bevel gear, is supported in the taper roller bearing 31 before inserting the drive shaft 21 in the drive shaft receiving bore 15b.

A needle bearing 33 is fitted in the lowermost bearing part $15b_8$ from below before inserting the drive shaft 21 in the drive shaft receiving bore 15b through the open upper end of the latter.

A lower end part of the drive shaft 21 extends through the needle bearing 33 into the gear chamber 15a. A drive gear 34, i.e., a bevel gear, is mounted on the lower end part of the drive shaft 21 extended in the gear chamber 15a so as to engage with the forward driven gear 32. A nut 35 is screwed on an externally threaded lower end part of the drive shaft 21 to fasten the drive gear 34 to the drive shaft 21.

An oil-pumping member 36 provided with an external thread is put on a middle part of the drive shaft 21 corresponding to the oil-pumping part $15b_6$ of the drive shaft receiving bore 15b.

Figure 11:
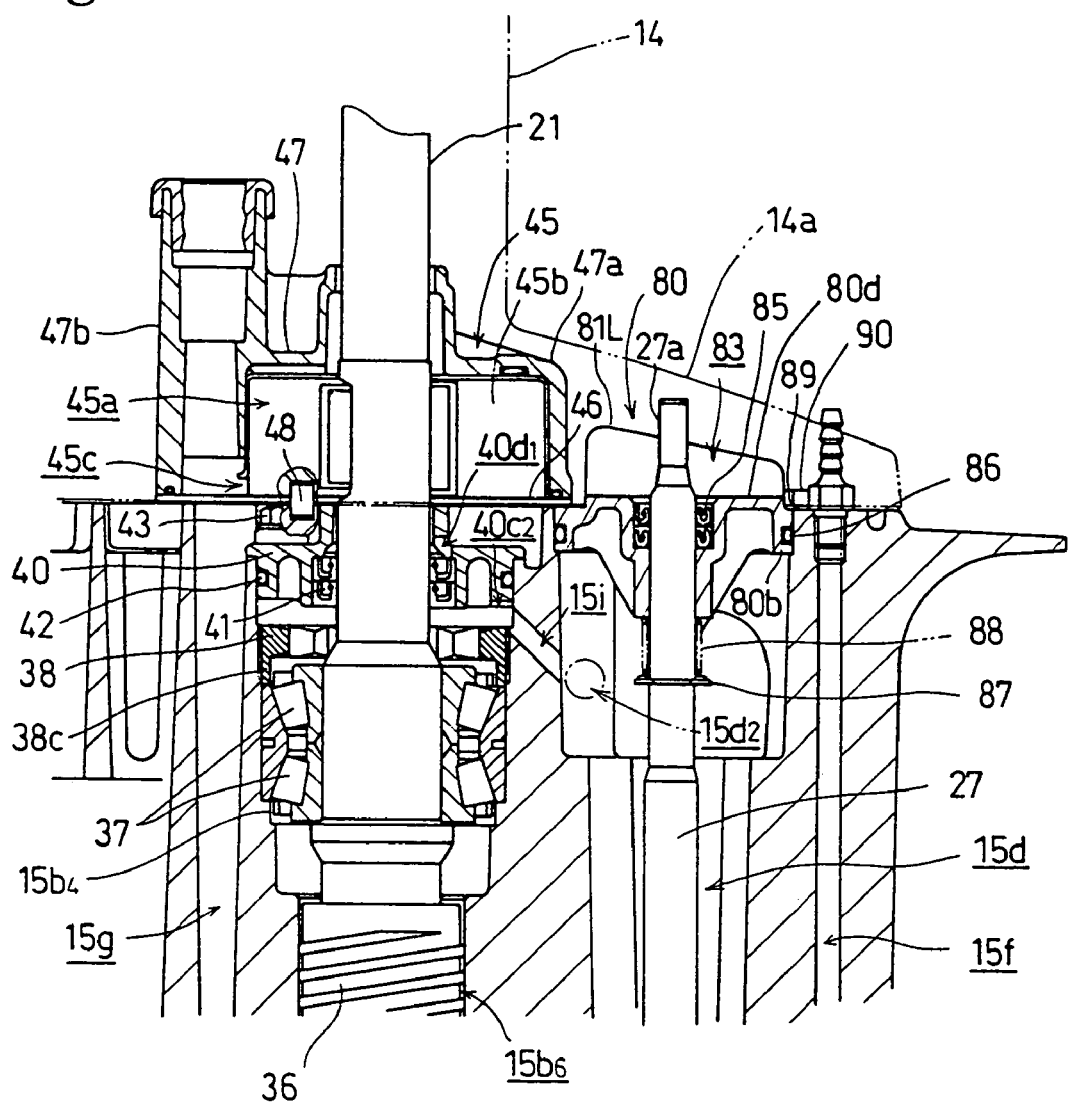
FIG. 11 is a sectional view of an upper essential part of the gear case shown in FIG. 2.

Referring to FIG. 11, two (for example) taper roller bearings 37 are fitted in the bearing part $15b_3$ to support the drive shaft 21. An externally threaded bearing-fastening ring 38 (FIG. 3) is screwed in the internally threaded part $15b_3$ to fasten the taper roller bearings 37 in place in the bearing part $15b_3$.

Figure 6:
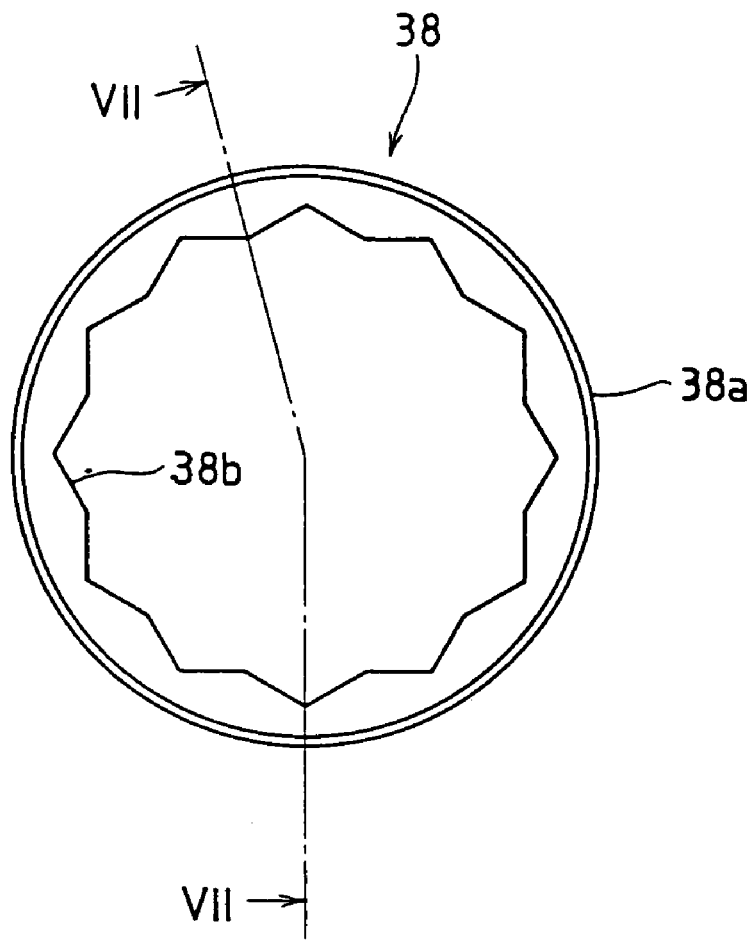
FIG. 6 is a top view of a bearing-fastening member.
Figure 7:
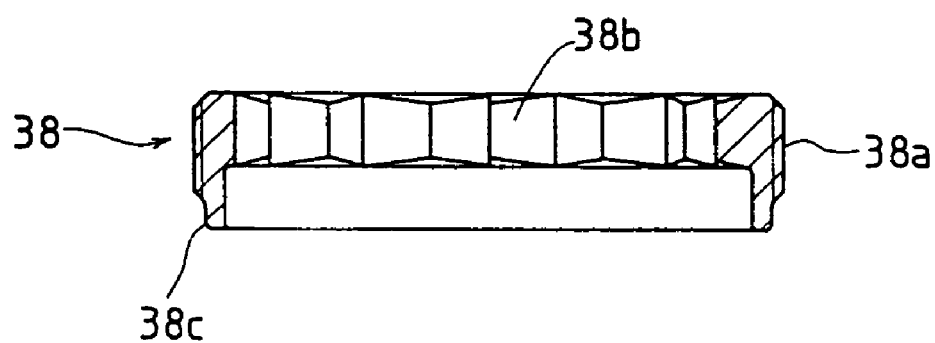
FIG. 7 is a sectional view taken on the line VII—VII in FIG. 6.

As shown in FIGS. 6 and 7, the bearing fastening ring 38 has an outside circumference provided with an external thread 38a, a stellate inside surface 38b with which a tool engages, and a downward annular skirt 38c.

When the bearing fastening ring 38 is screwed in the internally threaded part $15b_2$ of the drive shaft receiving bore 15B, the annular skirt 38c comes into contact with the outer ring of the upper taper roller bearing 37 fitted in the bearing parts $15b_3$ to press the outer ring of the lower taper roller bearing 37 against the shoulder $15b_4$, so that the taper roller bearings 37 are held firmly in place in the bearing part $15b_3$.

Thus, the drive shaft 21 inserted in the drive shaft receiving bore 15b is supported for rotation in the needle bearing 33 and the taper roller bearings 37 on the gear case 15, and is restrained from vertical movement by the taper roller bearings 37 fixedly held in place.

Figure 8:
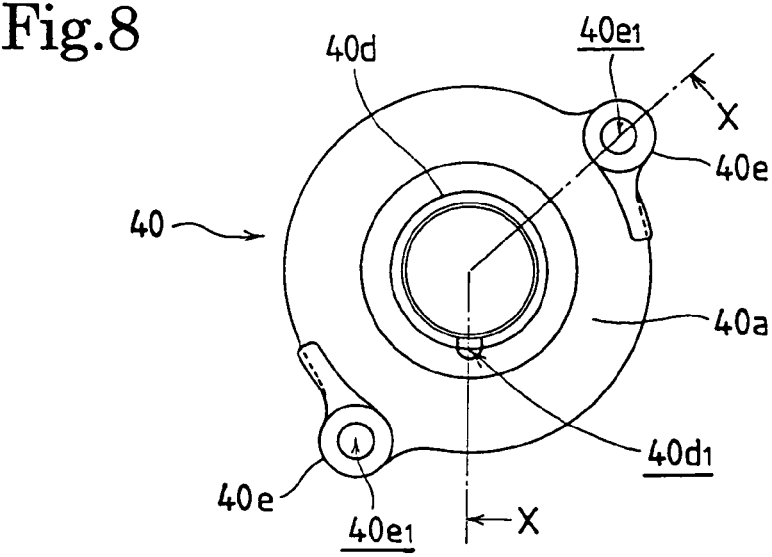
FIG. 8 is a top view of a covering member.
Figure 9:
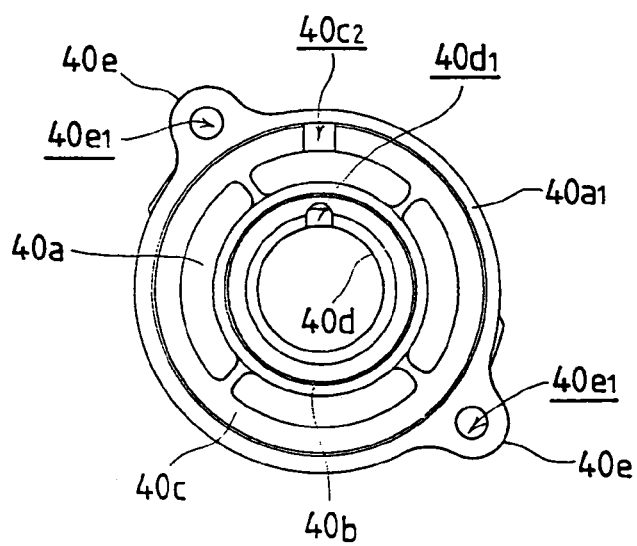
FIG. 9 is a bottom view of the covering member shown in FIG. 8.
Figure 10:
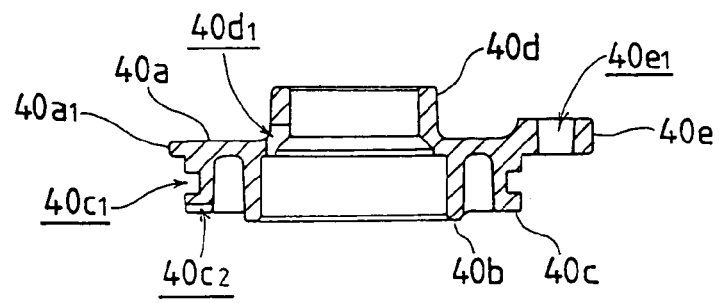
FIG. 10 is a sectional view taken on the line X—X in FIG. 9.

Referring to FIG. 11, a covering member 40 is fitted in the upper end part $15b_1$ to close the open upper end of the drive shaft receiving bore 15b. As shown in FIG. 8 to 10, the covering member 40 has a body part 40a having the shape of a disk and provided with a central circular hole, an upper cylindrical part 40d projecting upward from the body part 40a and surrounding the circular hole of the body part 40a, an inner cylindrical part 40b projecting downward from the body part 40a, and an outer cylindrical part 40c projecting downward from the body part 40a, coaxial with the inner cylindrical part 40b and surrounding the inner cylindrical part 40b.

The body part 40a has a flange $40a_1$ of a diameter slightly greater than the outside diameter of the outer cylindrical part 40c. The inner cylindrical part 40b has an outside diameter greater than that of the upper cylindrical part 40d. The body part 40a is provided with diametrically opposite bosses 40e respectively provided with bolt holes $40e_1$ on its periphery.

An annular groove $40c_1$ is formed in the outside circumference of the outer cylindrical part 40c. An oil passage $40c_2$ is formed in the lower edge of the outer cylindrical part 40c at a predetermined position. A drain hole $40d_1$ is formed in a lower front part of the upper cylindrical part 40d.

Referring to FIG. 11, a sealing member 41 is fitted in the inner cylindrical part 40b of the covering member 40, and an O-ring 42 is fitted in the annular groove $40c_1$ of the outer cylindrical part 40c. Then, the covering member 40 is fitted in the upper end part $15b_1$ of the drive shaft receiving bore 15b to close the open upper end of the drive shaft receiving bore 15b.

The outer cylindrical part 40c of the covering member 40 is fitted in the upper end part $15b_1$ and the O-ring 42 seals the gap between the side surface of the drive shaft receiving bore 15b and the outer cylindrical part 40c. The sealing member 41 seals the gap between the drive shaft 21 extending through the central hole of the covering member 40 and the covering member 40. Water seeped along the drive shaft 21 inside the upper cylindrical part 40d is stopped by the sealing member 41 and is drained forward through the drain hole $40d_1$.

The flange $40a_1$ of the covering member 40 is seated on an upper end surface of the gear case 15 around the open upper end of the drive shaft receiving bore 15b with the bosses 40e aligned with internally threaded bosses 15k (FIG. 4) protruding from the upper end surface around the open upper end of the drive shaft receiving bore 15b. Then, two bolts 43 passed through the bolt holes $40e_1$ of the bosses 40e are screwed in the internally threaded holes of the bosses 15k to fasten the covering member 40 to the upper end surface around the open upper end of the drive shaft receiving bore 15b of the gear case 15.

Referring again to FIG. 11, the lower end of the covering member 40 as attached to the gear case 15 is spaced from the upper end of the bearing fastening ring 38 to define a space between the covering member 40 and the bearing fastening ring 38. The connecting hole 15i opens into this space. Thus, the oil passage $40c_2$ is positioned such that the connecting hole 15i is not even partly closed even if the covering member 40 is disposed at the lowest possible position to position the forward extending wall 14a of the extension case 14 at a level below the lower end of the swivel shaft 6.

Thus, the open upper end of the drive shaft receiving bore 15b is covered with the covering member 40, and the taper roller bearings 37 supporting the drive shaft 21 for rotation are held fixedly in place by the bearing fastening ring 38.

Since the covering member 40 does not need to fasten the taper roller bearings 37, the covering member 40 can be sufficiently firmly fastened to the gear case 15 with the two bolts 43, the gear case 15 needs to be provided with only the two internally threaded bosses 15k around the drive shaft receiving bore 15b to avoid increasing the dimensions of the gear case 15. Increase in the width of the gear case 15, in particular, increases fluid resistance that acts on the moving gear case 15. Therefore, it is desired that the gear case 15 is formed in the narrowest possible width. The bearing fastening member 38 fixes the taper roller bearings 37 firmly to ensure that the drive shaft 21 is prevented from vertical movement.

As shown in FIG. 11, an under panel 46 is joined to the closed joining surface 19 surrounding the open upper ends of the drive shaft receiving bore 15b and the suction passage 15g with the drive shaft 21 extending through a hole formed in the under panel 46. A water pump 45 is mounted on the under panel 46. The water pump 45 is a displacement water pump driven by the drive shaft 21, The water pump 45 has a pump case 47 located by a locator pin 48 and fixedly joined to the joining surface 19 of the gear case with the under panel 46 held between the pump case 47 and the joining surface 19. An impeller included in the water pump 45 is formed by attaching a plurality of radial blades 45b to the drive shaft 21. The drive shaft 21 is eccentric with respect to a rotor chamber 45a defined by the pump case 47.

Figure 12:
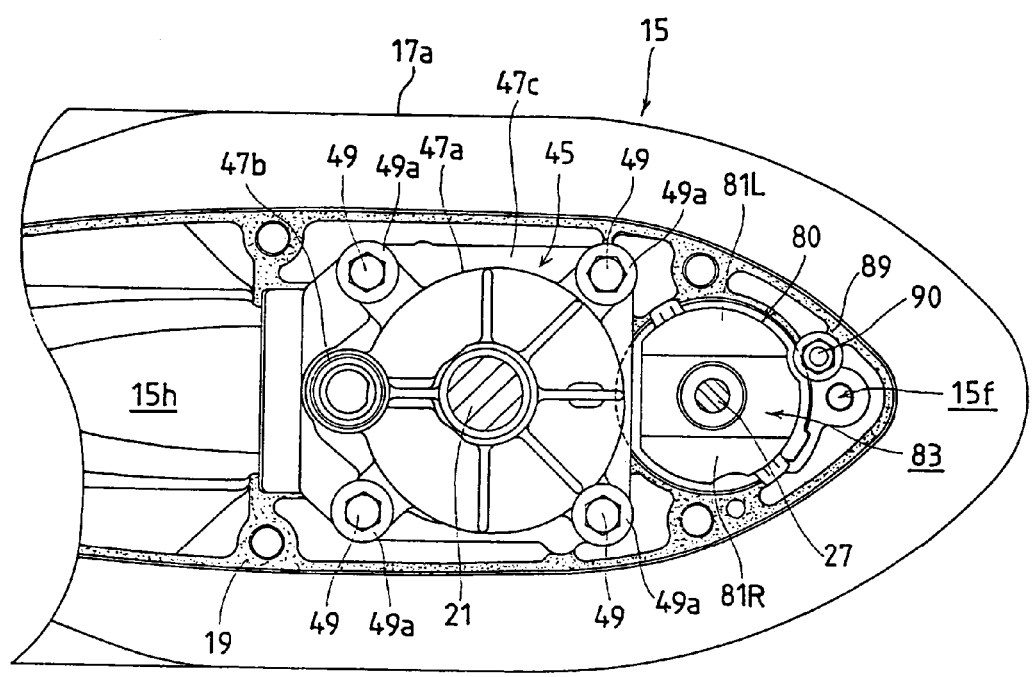
FIG. 12 is a top view of the upper essential part shown in FIG. 11.

The pump case 47 has a cylindrical part 47a defining the rotor chamber 45a, an upwardly extending, vertical discharge pipe 47b adjacent to the cylindrical part 47a, and a rectangular flange 47c having a shape corresponding to that of the under panel 46 and extending around the cylindrical part 47a and the discharge pipe 47b as shown in FIG. 12. Bolts 49 are passed through holes formed in the four corners of the flange 47c and are screwed in threaded holes formed in the joining surface 19 of the gear case 15 with washers held between the heads of the bolts 49 and the flange 47c to fasten the pump case 47 to the gear case 15.

A water passage, not shown, connects the suction passage 15g of the gear case 15 to the rotor chamber 45a. The rotor chamber 45a communicates with the discharge pipe 47b by means of a discharge port 45c formed in a lower part of a wall separating the rotor chamber 45a and the discharge pipe 47b from each other.

When the water pump 45 is driven by the drive shaft 21, water is sucked through the suction ports $15g_1$ formed in the side wall of the gear case 15 and covered with the filters 30, and the suction passage 15g into the rotor chamber 45a.

Water discharged through from the rotor chamber 45a through the discharge port 45c flows through a water tube connected to the discharge pipe 47b into the internal combustion engine 11 to cool the internal combustion engine 11.

The propeller shaft 24 is inserted in the propeller shaft receiving bore 15c. An assembly of the propeller shaft 24, a propeller shaft support member 50 rotatably supporting the propeller shaft 24, part of the bevel gear mechanism 22 and the forward/backward selector clutch mechanism 23 is inserted in the propeller shaft receiving bore 15c.

The propeller shaft 24 has a propulsion transmission flange 24a in its part nearer to the front end thereof relative to a middle part thereof, and a front cylindrical part 24b provided with a round bore extending from the front end surface thereof to a position near the flange 24a. A slot 24c having a big axial length is formed across the axis of the front cylindrical part 24b in a middle part of the front cylindrical part 24b.

Figure 13:
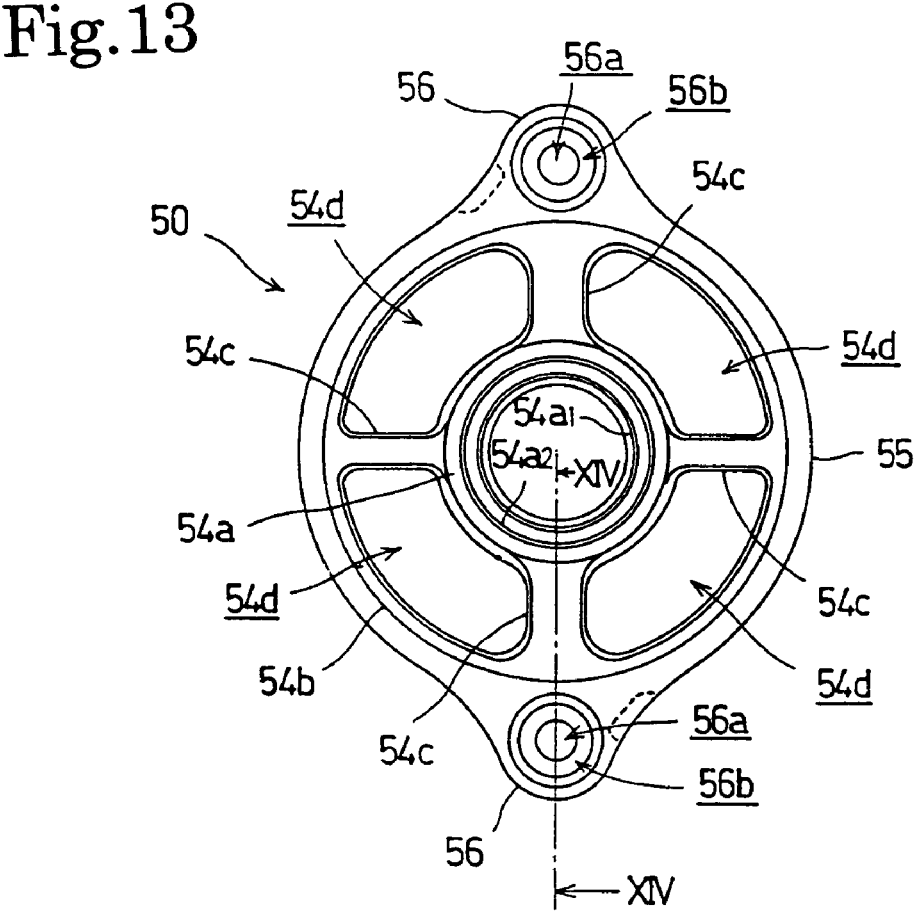
FIG. 13 is a rear plan view of a propeller shaft support member.
Figure 14:
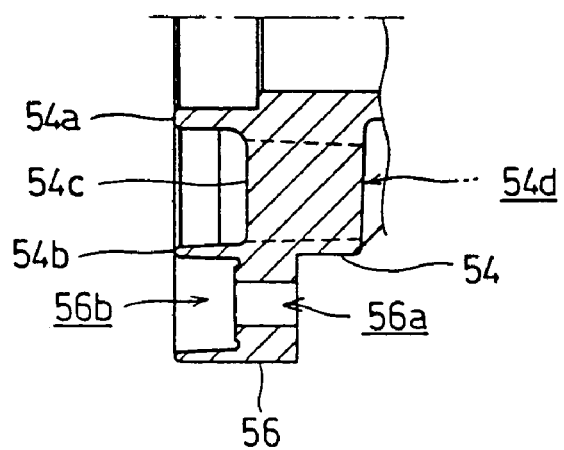
FIG. 14 is a sectional view taken on the line XIV—XIV in FIG. 13.
Figure 15:
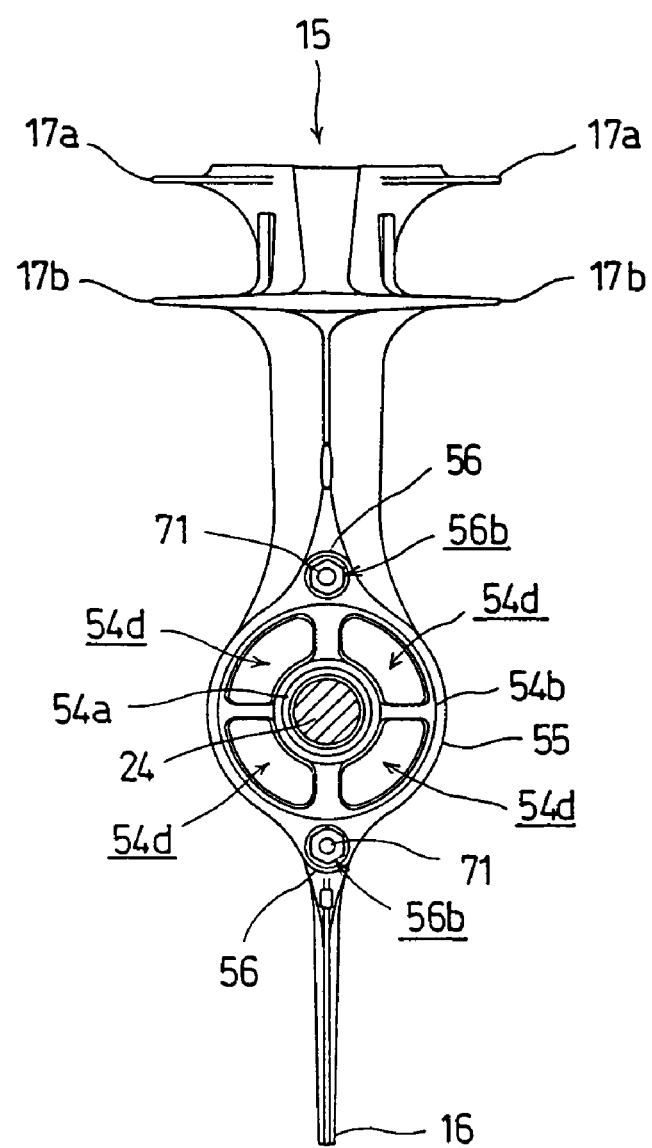
FIG. 15 is a rear view of an assembly of the gear case and the propeller shaft support member.

The propeller shaft support member 50 supports a middle part of the propeller shaft 24. As shown in FIGS. 2, 13 and 14, the propeller shaft support member 50 has an expanded front part 51 of a large diameter, an expanded back part 54 of a large diameter, a reduced middle part 53 of a small diameter, and a tapered part connecting the middle part and the front part 51.

Referring to FIG. 14, the back part 54 has an inner cylindrical part 54a, an outer cylindrical part 54b coaxial with the inner cylindrical part 54a, four radial arms 54c extending between the inner cylindrical part 54a and the outer cylindrical part 54b. The four arms 54c define exhaust openings 54d.

A back flange 55 extends around the outer cylindrical part 54b. Attaching bosses 56 respectively provided with bolt holes 56a protrude radially outward from diametrically opposite parts of the back flange 55. Back end parts of the bolt holes 56a are counterbored to form counterbores 56b.

The depth of the counterbores 56b is slightly greater than the thickness of the head of bolts 71 that fasten the back flange 55 to the gear case 15. When the bolts 71 are passed forward through the bolt holes 56a of the attaching bosses 56 and screwed in threaded holes 18c formed in the gear case 15, the heads of the bolts 71 sink entirely in the counterbores 56b.

The propeller shaft 24 is inserted through the front end of the propeller shaft support member 50 in the latter with a thrust bearing 60 held between the flange 24a of the propeller shaft 24 and a shoulder formed in the bore of the propeller shaft support member 50, and a needle bearing 61 and a sealing member 62 are put on the propeller shaft 24 as shown in FIG. 2. A ball bearing 63 is fitted in the front part of the propeller shaft support member 50, and the cylindrical boss of a backward driven gear 64, i.e., a bevel gear, is fitted in the inner ring of the ball bearing 63.

The backward driven gear 64 is spaced from the propeller shaft 24. The propeller shaft 24 and the backward driven gear 64 are supported on the propeller shaft support member 50 for individual rotation.

A shift slider has a front shift slider 65 and a back shift slider 66 coaxially connected to the front shift slider 65. The back shift slider 66 is axially slidably inserted in the front cylindrical part 24b of the propeller shaft 24. A cylindrical drive-mode selecting member 67 is axially slidably mounted on the front cylindrical part 24b.

The front shift slider 65 is integrally provided with a pair of flanges 65a and 65b in its back part. The back shift slider 66 has a hollow, round, tubular part having a round bore extending from the front end thereof to a position near the back end thereof. The front shift slider 65 has a reduced back part fitted in a front part of the round bore of the back shift slider 66. A pin is passed across the axis of the propeller shaft 24 through the hollow, round, tubular part of the back shift slider 66 and the reduced back part of the front shift slider 65 fitted in the front part of the back shift slider 66 to couple the front shift slider 65 and the back shift slider 66. Thus, the slider is formed of a small number of parts to reduce cost.

The hollow, round, tubular part of the back shift slider 66 having an open front end facilitate building a detent mechanism using a compression spring in the hollow, round, tubular part. A clutch shifter pin 68 is passed through a back part of the back shift slider 66 perpendicularly to the axis of the back shift slider 66. The clutch shifter pin 68 extends through the slot 24c formed in the front cylindrical part 24b of the propeller shaft 24 into a round hole formed in the drive-mode selecting member 67.

The front shift slider 65 and the back shift slider 66 are moved simultaneously axially to shift the drive-mode selecting member 67 with the clutch shifter pin 68 in a range corresponding to the axial length of the slot 24c.

The assembly of the propeller shaft 24, the propeller shaft support member 50 rotatably supporting the propeller shaft 24, the back ward driven gear 64 of the bevel gear mechanism 22, and the forward/backward selector clutch mechanism 23 is inserted in the propeller shaft receiving bore 15c.

The respective outside diameters of the expanded front part 51 and the expanded back part 54 of the propeller shaft support member 50 are substantially equal to the diameter of the propeller shaft receiving bore 15c. An O-ring is put on the front part 51 of the propeller shaft support member 50 before inserting the propeller shaft support member 50 in the propeller shaft receiving bore 15c.

A front end part of the front cylindrical part 24b of the propeller shaft 24 is fitted in the needle bearing 70 fitted beforehand in the boss of the forward driven gear 32 inserted previously in the bottom of the gear chamber 15a. A front part of the front shift slider 65 projecting forward from the cylindrical part 24b is received axially slidably and rotatably in a cylindrical hole 15e$_1$ formed in the bottom of the recess 15e.

The shift slider consisting of the front shift slider 65 and the back shift slider 66 is supported axially slidably and rotatably for a reliable shifting action.

The backward driven gear 64 is engaged with the drive gear 34 mounted on the lower end part of the drive shaft 21 to form the bevel gear mechanism 22 in the gear chamber 15a.

The drive gear 34 rotates together with the drive shaft 21. The drive shaft 21 drives the forward driven gear 32 for rotation in the normal direction, and drives the backward driven gear 64 for rotation in the reverse direction.

The drive-mode selecting member 67 is disposed axially slidably between the forward driven gear 32 and the backward drive gear 64 to form the forward/backward selector clutch mechanism 23. The drive-mode selecting member 67 is provided on its opposite end surfaces with teeth, and the forward drive gear 32 and the backward driven gear 32 are provided on their end surfaces facing the drive-mode selecting member 67 with teeth that are able to engage with the teeth of the drive-mode selecting member.

The forward/backward selector clutch mechanism 23 is in a neutral state when the drive-mode selecting member 67 is engaged with neither the forward driven gear 32 nor the backward driven gear 64.

When the drive-mode selecting member 67 is shifted forward and engaged with the forward driven gear 32, the rotation in the normal direction of the forward driven gear 32 is transmitted through the drive-mode selecting member 67 and the clutch shifter pin 68 to the propeller shaft 24 to rotate the propeller shaft 24 in the normal direction, and thereby the boat is propelled forward.

When the drive-mode selecting member 67 is shifted backward and engaged with the backward driven gear 64, the rotation in the reverse direction of the backward driven gear 32 is transmitted through the drive-mode selecting member 67 and the cutch shifter pin 68 to the propeller shaft 24 to rotate the propeller shaft 24 in the reverse direction, and thereby the boat is propelled backward.

When the propeller shaft support member 50 supporting the propeller shaft 24 is inserted in the propeller shaft receiving bore 15c, the back flange 55 formed at the back end of the back part 54 of the propeller shaft support member 50 comes into close contact with the back end surface 18a (an area shaded with dots in FIG. 5), in which the propeller shaft receiving bore 15c opens, of the gear case 15.

In this state, the attaching bosses 56 radially protruding from the back flange 55 are seated on the joining surfaces 18b of bosses provided with bolt holes 18c and extending upward and downward, respectively, from the back end surface 18a in which the propeller shaft receiving bore 15c opens (FIGS. 3 and 5). the respectively provided with bolt holes 56a protrude radially outward from diametrically opposite parts of the back flange 55. The bolts 71 are passed through the bolt holes 56a of the attaching bosses 56 and screwed in the threaded holes 18c formed in the gear case 15 to fasten the propeller shaft support member 50 to the gear case 15.

When the propeller shaft support member 50 inserted in the propeller shaft receiving bore 15c is thus fastened to the gear case 15, the exhaust passages 15h of the gear case 15 communicate with a substantially annular space around the reduced middle part 53 of the propeller shaft support member 50, and the substantially annular space communicates with the exhaust openings 54d of the back part 54. Thus, the exhaust passages 15h communicates with the exhaust openings 54d.

The screw propeller 25 is mounted on a back part, projecting backward from the propeller shaft support member 50, of the propeller shaft 24.

As shown in FIG. 2, the screw propeller 25 has a cylindrical hub 25a, and blades 25b mounted on the hub 25a. A rubber bush 25c is fitted in the cylindrical hub 25a, and the cylindrical hub 25a is mounted on the back part of the propeller shaft 24.

As mentioned above, the heads of the bolts 71 sink entirely in the counterbores 56b formed in the attaching bosses 56 when the bolts 71 are passed through the bolt holes 56a of the attaching bosses 56 and screwed in the threaded holes 18c formed in the gear case 15. Therefore, separate members for concealing the heads of the bolts 71 are not required so that the total number of parts is reduced and good outer appearance of the bolt heads is obtained.

The parts to be fastened by the bolts 71 are the attaching bosses 56 that radially outwardly protrude from the back flange 55, and the heads of the bolts 71 are sunk in the counterbores 56b, respectively. Therefore, the cylindrical hub 25a of the screw propeller 25 does not need to be extended radially to the positions of the attaching bosses 56 such that the cylindrical hub 25a conceals the heads of the bolts 71, and the cylindrical hub 25a may be formed in a small diameter as shown in FIG. 2 to reduce fluid resistance that acts on the cylindrical hub 25a.

The lower shift rod 27 is inserted in the shift rod receiving bore 15d formed parallel to the drive shaft receiving bore 15b (substantially vertically) in front of the drive shaft receiving bore 15b. As shown in FIG. 3, the shift rod receiving bore 15d has an expanded top part $15d_1$ having the largest diameter and opening in the joining surface 19, and a reduced bottom part $15d_2$ opening into the recess 15e.

A bearing holder 29 rotatably supports a lower part of the lower shift rod 27. A shift fork 28 eccentric to the lower shift rod 27 projects downward from the lower end of the lower shift rod 27.

When the lower shift rod 27 is inserted in the shift rod receiving bore 15d, the bearing holder 29 is seated on a shoulder at the open upper end of the bottom part $15d_2$ of the shift rod receiving bore 15d, the lower part of the lower shift rod 27 extends through the bottom part $15d_2$, and the eccentric shift fork 28 engages in the groove between the pair of flanges 65a and 65b of the front shift slider 65.

Figure 16:
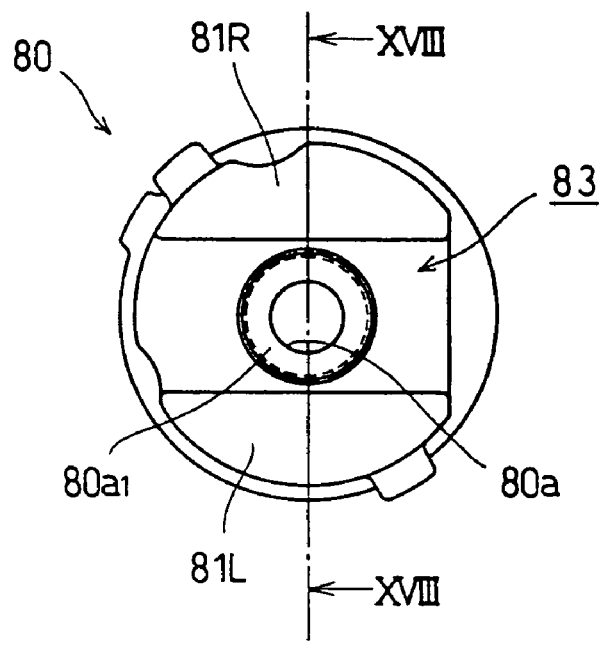
FIG. 16 is a top view of a closing member.
Figure 17:
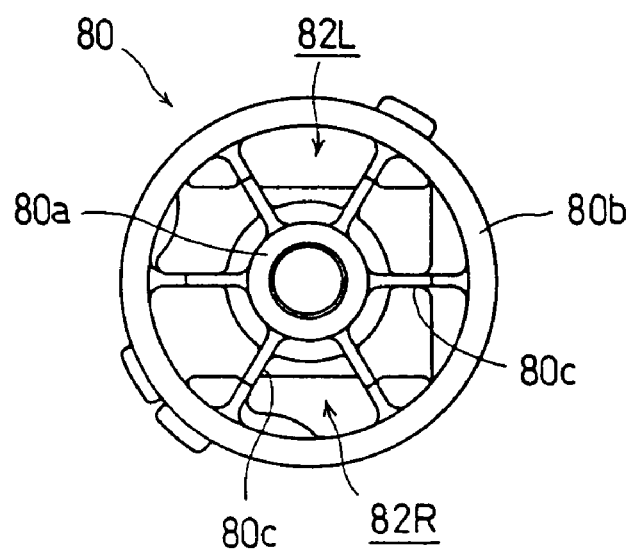
FIG. 17 is a bottom view of the closing member shown in FIG. 16.
Figure 18:
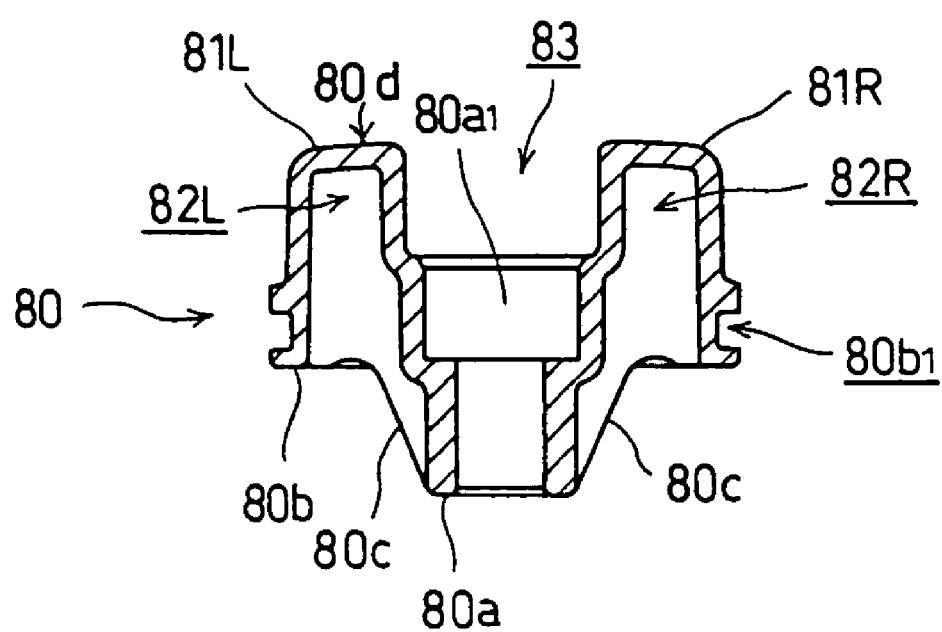
FIG. 18 is a sectional view taken on the line XVIII—XVIII in FIG. 16.

An upper part of the lower shift rod 27 extends upward through and supported for rotation by a covering member 80 closing the shift rod receiving bore 15d. As shown in FIGS. 16 to 18, the covering member 80 has a inner cylindrical part 80a, a flat outer cylindrical part 80b, radial ribs 80c connecting the inner cylindrical part 80a and the outer cylindrical part 80b, and a upper wall 80d covering an annular space between the inner cylindrical part 80a and the outer cylindrical part 80b.

Diametrically opposite parts of the upper wall 80d bulge upward to form a right bulged wall 81R and a left bulged wall 81L. The bulged walls 81R and 81L define presure-compensating air chambers 82R and 82L. A longitudinal groove 83 is formed between the bulged walls 81R and 81L. The vertical bore of the inner cylindrical part 80a opens into a middle part of the groove 83.

The respective outside surfaces of the bulged walls 81R and 81L are included in the same cylindrical plane and are separated by the groove 83.

An upper part of the round bore of the inner cylindrical part 80a is expanded to form an expanded end part $80a_1$. A sealing member 85 is fitted in the expanded end part $80\ 80a_1$ as shown in FIG. 11. The outer cylindrical part 80b protrude from the outside surfaces of the bulged walls 81R and 81L.

An annular groove $80b_1$ is formed in the outside surface of the outer cylindrical part 80b, and an O-ring 86 is fitted in the annular groove $80b_1$.

The covering member 80 is fitted in the open upper end of the shift rod receiving bore 15d to close the latter. As shown in FIG. 11, the outer cylindrical part 80b of the covering member 80 is fitted in the top part $15d_1$ of the shift rod receiving bore 15d. The O-ring 86 seals the gap between the outer cylindrical part 80b and the side surface of the top part $15d_1$ of the shift rod receiving bore 15d, and the sealing member 85 seals the gap between the lower shift rod 27 and the inner cylindrical part 80a of the covering member 80.

A spring 88 is extended between the lower end of the inner cylindrical part 80a of the covering member 80, and a snap ring 87 put in an annular groove formed in a part of the lower shift rod 27 to press the lower shift rod 27 downward so that the lower shift rod 27 may not shake.

The outer cylindrical part 80b protruding from the cylindrical plane including the outside surfaces of the bulged walls 81R and 81L of the covering member 80 sinks completely in the top part $15d_1$ of the shift rod receiving bore 15d. The under panel 46 on which the water pump 45 is mounted and an end part of the pump case 47 are pressed against the upper surface of a back part of the outer cylindrical part 80b to hold the covering member 80 in place as shown in FIGS. 11 and 12.

As shown in FIG. 12, a large-diameter washer 89 is pressed against the upper surface of a front part of the outer cylindrical part 80b of the covering member 80 with a bolt 90 screwed through the washer 89 in a threaded hole 15p (FIG. 4) formed in the joining surface 19 of the gear case 15.

Since the front and the back part of the upper end wall of the outer cylindrical part 80b fitted in the top part $15d_1$ of the shift rod receiving bore 15d are pressed down by the pump case 47 and the large-diameter washer 89, the covering member 80 can be securely held in place even if the pressure in the shift rod receiving bore 15d increases, any bolts and threaded holes are not necessary for holding the covering member 80 in place. Consequently, the number of necessary parts is small, part around the covering member 80 of the gear case can be designed in a compact arrangement, and increase in the dimensions of the gear case can be avoided.

An upper end part 27a, to be connected to the upper shift rod 26, of the lower shift rod 27 projects upward from the inner cylindrical part 80a of the covering member 80 into the groove 83 between the bulged walls 81R and 81L.

The sealing member 85 seals the gap between the lower end of the upper end part 27a and the covering member 80. The exposed upper surface of the sealing member 85 is flush with the upper wall of the upper wall 80d, i.e., the bottom of the groove 83 of the covering member 80. Water that flows down along the upper shift rod 26 does not stay on the covering member 80 because the water is stopped by the sealing member 85 and is drained through the longitudinal groove 83.

When the lower shift rod 27 coupled with the upper shift rod 26 is turned, the shift fork 28 attached to the lower end of the lower shift rod 27 turns. Consequently, the front shift slider 65 and the back shift slider 66 are moved axially to set the forward/backward selector cutch mechanism 23 selectively in a forward drive position, a backward drive position or a neutral position.

Both the drive shaft receiving bore 15b and the shift rod receiving bore 15d connected to the drive shaft receiving bore 15b by the connecting hole 15i communicates with the gear chamber 15a. A threaded hole $15d_2$ is formed in the gear case 15 so as to open into the shift rod receiving bore 15d at a level corresponding to the opening of the connecting hole 15i opening into the shift rod receiving bore 15d as shown in FIG. 11 to maintain the level of the lubricating oil contained in the gear case 15 at the level of the taper roller bearing 37.

The drive shaft receiving bore 15b communicates with the shift rod receiving bore 15d by means of the connecting hole 15i. When the internal combustion engine 11 operates to rotate the drive shaft 21, the oil-pumping member 36 pumps up the lubricating oil.

The lubricating oil pumped up by the oil-pumping member 36 lubricates the taper roller bearings 37, flows through a central hollow of the bearing fastening member 38, the space under the covering member 40 and the connecting hole 15i into the shift rod receiving bore 15d to lubricate the lower shift rod 27.

The respective open upper ends of the drive shaft receiving bore 15b and the shift rod receiving bore 15d are closed by the covering members 40 and 80, respectively, and the gear chamber 15 and the spaces communicating with the gear chamber 15 are sealed in a liquid-tight fashion to prevent the leakage of the lubricating oil from the gear case 15 and the leakage of water into the gear case 15.

The gear case 15 is designed such that the space in the gear case 15 including the gear chamber 15a has the least necessary volume to build the outboard engine 10 in lightweight construction and to reduce the fluid resistance that acts on the outboard engine 10. The air chambers in upper parts of the drive shaft receiving bore 15b and the shift rod receiving bore 15d have limited volumes, respectively.

When the lubricating oil is caused to expand by heat generated by the bevel gear mechanism 22, air in the upper spaces in the gear case 15 is compressed to absorb the change of the volume of the lubricating oil. The pressure-compensating air chambers 82R and 82L of the covering member 80 are formed in a volume sufficient to contain air necessary for absorbing the change of the volume of the lubricating oil due to thermal expansion. Consequently, the increase of the pressure in the gear case 15 can be limited below the upper limit of an allowable pressure range.

The covering member 80 covering the open upper end of the shift rod receiving bore 15d receiving the lower shift rod 27 is provided with the bulged walls 81R and 81L defining the pressure-compensating air chambers 82R and 82L and formed in a dead space extending over the covering member 80. Thus, the covering member 80 has an additional pressure compensating function and the number of parts, assembling work and cost can be reduced.

Since any special holes connected to the gear chamber 15a are not necessary, the cost can be further reduced.

The covering member 80 is capable of supporting the lower shift rod 27 extending through the former. Thus, the covering member 80 has three functions, namely, a gear chamber covering function, a pressure compensating function and a lower shift rod supporting function.

The covering member 80 has compact construction; the inner cylindrical part 80a, supporting the lower shift rod 27, of the covering member 80 extends below the joining surface 19 of the gear case 15; and the bulged walls 81R and 81L defining the pressure-compensating air chambers 82R and 82L lie above the joining surface 19. The inner cylindrical part 80a supports the lower shift rod 27 securely.

The height of the space extending over the covering member 80 is limited by the forward extending wall 14a of the extension case 14. Therefore, the forward extending wall 14a of the extension case 14 is spaced a predetermined distance from a middle part 8a of the connecting member 8 to facilitate work for coupling the upper shift rod 26 and the lower shift rod 27.

The lower connecting member 8 serving as a component of a vibration-isolating outboard engine support structure can be positioned at a low level to achieve a desired vibration isolating function by positioning the forward extending wall 14a of the extension case 14 at a low level.

The upper walls of the bulged walls 81R and 81L declines forward so as to conform to the shape of the forward extending wall 14a of the extension case 14 to increase the volumes of the pressure-compensating air chambers 82R and 82L to the largest possible extend in the limited space under the forward extending wall 14a of the extension case 14 at the low level.

The shift rod consists of the upper shift rod 26 and the lower shift rod 27, the lower shift rod 27 is extended through the covering member 80, and the upper end part 27a of the lower shift rod 27 projects upward from the covering member 80. Therefore, the gear case 15 and the components contained in the gear case can be easily assembled in a unit. Since the lower shift rod 27 turns about its axis and does not move vertically relative to the covering member 80, the gap between the lower shift rod 27 and the covering member 80 can be perfectly sealed.

What is claimed is:

1. A drive shaft support structure for a marine propulsion machine having a vertical drive shaft, and a gear case forming a lower part of the marine propulsion machine and provided with a vertical drive shaft receiving bore receiving said drive shaft in a bearing fixedly held in the drive shaft receiving bore and with a gear chamber connected to a lower end of the drive shaft receiving bore and receiving therein a bevel gear mechanism for transmitting power of a drive shaft to a propeller shaft, said gear chamber storing therein a lubricating oil, said drive shaft support structure comprising:
 a bearing-fastening member for holding the bearing in the drive shaft receiving bore so that the bearing is substantially vertically fixed in place in the drive shaft receiving bore; and
 a covering member disposed above the bearing-fastening member, and closing an upper end of the drive shaft receiving bore in a liquid-tight fashion, said covering member having a body part penetrated by the drive shaft and a downwardly projecting part projecting downward from the body part, said downwardly projecting part being closely fitted in said upper end of the drive shaft receiving bore and having an oil passage forming a part of a lubricating oil flow path which extends from said gear chamber through said drive shaft receiving bore to a space between the bearing-fastening member and the covering member and from said space to an outside of the drive shaft receiving bore through a connecting hole for conducting the lubricating oil to the outside.

2. The drive shaft support structure according to claim 1, wherein the gear case is provided in a part of the drive shaft receiving bore with an internal thread, the bearing-fastening member is provided with an external thread capable of mating with the internal thread of the gear case, and the bearing-fastening member is screwed in the internal threaded part of the drive shaft receiving bore to hold the bearing in place in the drive shaft receiving bore.

3. The drive shaft support structure according to claim 2, wherein a part of the drive shaft receiving bore extending below the internal thread is reduced to form a shoulder, wherein the bearing is seated on the shoulder, and wherein the bearing-fastening member is screwed in the part provided with the internal thread of the drive shaft receiving bore so as to press the bearing against the shoulder, in order to hold the bearing between the bearing-fastening member and the shoulder.

4. The drive shaft support structure according to claim 3, wherein a pert of the drive shalt receiving bore between the internal thread and the shoulder is tapered downwardly to form a tapered bearing part, wherein the bearing has a tapered circumference tapering downwardly, and wherein the bearing is held in place in the drive shaft receiving bore with the tapered circumferences thereof in close contact with the tapered surface of the tapered bearing part of the drive shaft receiving bore.

5. The drive shaft support structure according to claim 2, wherein the bearing-fastening member has a ring shape and has a polygonal central hole in which a turning tool engages.

6. The drive shaft support structure according to claim 2, wherein the bearing-fastening member is provided at its lower end with an annular ridge that is pressed against the bearing.

7. The drive shaft support structure according to claim 1, wherein an open upper end of the drive shaft receiving bore is sunk beneath an upper surface of the gear case, the covering member is provided with a flange, and the covering member is positioned with the flange seated on the open upper end of the drive shaft receiving bore.

8. The drive shaft support structure according to claim 7, wherein the covering member has a body part having the shape of a disk, an upper cylindrical part projecting upward from the body part, an inner cylindrical part projecting downward from the body part, and an outer cylindrical part projecting downward from the body part and surrounding the inner cylindrical part, and the outer cylindrical part is fitted in the upper end part of the drive shaft receiving bore.

9. The drive shaft support structure according to claim 7, wherein the body part of the covering member☐is provided with a boss, and the boss is attached to the gear case.

10. The drive shaft support structure according to claim 8, wherein a sealing member is held between the inner cylindrical part and the drive shall, and an O-ring is held between the outer cylindrical part and a side surface of the drive shall receiving bore.

11. The drive shaft support structure according to claim 1, wherein a space is formed between the covering member and the bearing-fastening member in the drive shaft receiving bore, and the space is connected through a connecting hole to a lubricant supply source.

12. The drive shaft support structure according to claim 1, wherein an under panel having an opening through which the drive shaft is passed is disposed on the upper surface of the gear case so as to extend across the drive shaft receiving bore, and a water pump driven by the drive shaft is mounted on the under panel.

13. The drive shaft support structure of claim 1, wherein the bearing-fastening member comprises a bearing fastening ring having an outside circumference provided with an external thread, a molded inside surface for receiving a working end of a tool, and a downwardly extending annular skirt.

14. A drive shaft support structure for a marine propulsion machine comprising a vertical drive shaft and a gear case forming a lower part of the marine propulsion machine and provided with a vertical drive shaft receiving bore containing a bearing, and a gear chamber connected to a lower end of the drive shaft receiving bore for receiving a bevel gear mechanism for transmitting power of the drive shaft to a propeller shaft, said drive shaft being supported in the drive shaft receiving bore for rotation in a bearing, said drive shaft support structure comprising a bearing-fastening member for holding the bearing in place in the drive shaft receiving bore; and a covering member disposed above the bearing-fastening member and closing an upper end of the drive shaft receiving bore in a liquid-tight fashion, said covering member having a body part penetrated by the drive shaft and a downwardly projecting part projecting downward from the body part, said downwardly projecting part being closely fitted in said upper end of the drive shaft receiving bore and having an oil passage forming a part of a lubricating oil flow path which extends from said gear chamber through said drive shall receiving bore to a space between the bearing-fastening member and the covering member and from said space to an outside of the drive shall receiving bore through a connecting hole for conducting the lubricating oil to the outside.

15. The drive shaft support structure of claim 14, wherein the bearing-fastening member comprises, a molded inside surface for receiving a working end of a tool, and a downwardly extending annular skirt.

16. The drive shaft support structure of claim 14, further comprising a covering seal member disposed above the bearing-fastening member, and closing an upper end of the drive shaft receiving bore in a liquid-tight fashion;

wherein said covering seal member has a hollow bore formed therein to receive the drive shaft therethrough.

* * * * *